United States Patent
Lukas et al.

(10) Patent No.: US 9,118,659 B2
(45) Date of Patent: Aug. 25, 2015

(54) METHOD AND APPARATUS FOR AUTHENTICATING LOCATION-RELATED MESSAGES

(75) Inventors: Klaus Lukas, Munich (DE); Reiner Mueller, Peiting (DE); Elmar Sommer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 16 days.

(21) Appl. No.: 14/000,660

(22) PCT Filed: Feb. 3, 2012

(86) PCT No.: PCT/EP2012/051826
§ 371 (c)(1),
(2), (4) Date: Aug. 21, 2013

(87) PCT Pub. No.: WO2012/113637
PCT Pub. Date: Aug. 30, 2012

(65) Prior Publication Data
US 2013/0333017 A1  Dec. 12, 2013

(30) Foreign Application Priority Data
Feb. 21, 2011 (DE) .......... 10 2011 004 469

(51) Int. Cl.
*H04L 29/06* (2006.01)
*H04L 12/58* (2006.01)
*H04L 29/08* (2006.01)

(52) U.S. Cl.
CPC ........ *H04L 63/0823* (2013.01); *H04L 12/5865* (2013.01); *H04L 51/20* (2013.01); *H04L 63/126* (2013.01); *H04L 67/18* (2013.01)

(58) Field of Classification Search
CPC ............ H04L 63/0823; H04L 12/5865; H04L 9/0006; H04L 9/3247; H04L 9/3263; G06F 21/33
USPC ........................................................... 726/10
See application file for complete search history.

(56) References Cited

U.S. PATENT DOCUMENTS

| | | |
|---|---|---|
| 8,090,949 B2 * | 1/2012 | Bellur et al. ................... 713/175 |
| 2004/0193922 A1 | 9/2004 | Bandini et al. |
| 2006/0080529 A1 * | 4/2006 | Yoon et al. ..................... 713/168 |
| 2008/0305795 A1 * | 12/2008 | Murakami et al. ......... 455/435.1 |
| 2009/0077620 A1 | 3/2009 | Ravi et al. |
| 2010/0109835 A1 | 5/2010 | Alrabady et al. |
| 2011/0145585 A1 * | 6/2011 | Campagna et al. ........... 713/176 |
| 2012/0133552 A1 | 5/2012 | Wu |

FOREIGN PATENT DOCUMENTS

| | | |
|---|---|---|
| WO | 2011006708 A1 | 1/2011 |
| WO | 2011019978 A1 | 2/2011 |

\* cited by examiner

*Primary Examiner* — Justin T Darrow
*Assistant Examiner* — Hee Song
(74) *Attorney, Agent, or Firm* — Laurence A. Greenberg; Werner H. Stemer; Ralph E. Locher

(57) ABSTRACT

A method and an apparatus protect location-related messages which are transmitted from a provider to a plurality of temporally changing recipients and receiver devices in a plurality of localities in each case. The method and apparatus are distinguished by the fact that key certificates for signed messages are issued only in a location-related manner and are thus valid only in a particular defined local environment.

27 Claims, 2 Drawing Sheets

METHOD AND APPARATUS FOR AUTHENTICATING LOCATION-RELATED MESSAGES

BACKGROUND OF THE INVENTION

Field of the Invention

The present invention relates to a method and an apparatus for protecting location-related messages.

Conventional technologies allow for a location-based display and provision of information and its possible additional referenced further contents. This information can be allocated to a group of recipients defined by the producer, wherein the recipient can also be the producer. In this situation, authentication of the recipients in particular plays an important part, if, for example, specific or security-relevant messages, which, for example, are comparable to digital postits, are deposited at specific locations. The authentication of the user is a known problem, and can be resolved, for example, by means of identity-based systems.

There are also scenarios, however, in which, in addition, the authenticity of the location-based message plays an important part. In the industrial and energy environment, for example, warning messages in the surroundings of a specific critical locality are relevant, and their authenticity is very important. Likewise, in hospital and airport infrastructures authentic location-based information is necessary for security and operating personnel, and must be of legitimated origin. In the scenarios described, in this context, a frequent change of personnel and equipment is to be assumed, such that a very large and dynamically changing user group must be assumed, who must be able to rely on the authenticity of the messages.

Conventionally, with location-based services an identity-based authentication of a user, i.e. related to information such as their name or personnel number, has been made the focus, in order not to forward messages to unauthorized persons.

US 2009/0077620 A1 discloses location-based access restrictions with which authentication and authenticating are carried out on the basis of the present locations concerned. The authenticity of the messages is implied by a correct addressing of the location-based service.

In addition, general identity-based PKI methods are known, i.e. Public Key Infrastructures, i.e. infrastructures with public keys, which allocate the identity of the user to the private key in a secure manner.

BRIEF SUMMARY OF THE INVENTION

The object of the present invention is to provide a method and an apparatus for protecting messages which are transmitted from a provider to a plurality of temporally changing recipients and receiver facilities in a plurality of locations in each case. For example, it is intended that in the industry, energy, airport, or hospital environment, authentic location-relevant information of legitimate origin should only be accessible for an authorized group of recipients in a relevant locality.

A locality in this context is an area which is clearly delineated in respect of its spatial extents and can be determined by means of corresponding points, lines, or surfaces. A locality can be determined as a mathematical point, a mathematical surface, or a mathematical space in a three-dimensional co-ordinate system. A locality can be determined by means of boundary points, boundary lines, or boundary surfaces. Specific examples of localities can be specific rooms or storeys in buildings. Such buildings can be buildings of factories, power stations, airports, or hospitals. A locality can be entered by a plurality of temporally changing persons.

Likewise, a plurality of different communications facilities can be used by the persons.

The object is resolved by a method as claimed in the main claim and an apparatus as claimed in the subclaim.

According to a first aspect, a method is claimed for protecting a plurality of location-related messages, which are transmitted from at least one provider to a plurality of temporally changing recipients and/or temporally changing receiver facilities in at least one specific locality, with the following steps: By means of the transmission, carried out by the provider of, in each case, a signature for proof of the originator status of the respective provider and its belonging to the respective message, to at least one specific locality. By means of the provision, carried out by at least one key provider, for the respective specific locality, of publicly valid key certificates for the respective specific locality. By means of the checking, carried out by the key certificates, of the signature of each message received, and verification or determination of the false status of the respective message according to the result of the check.

According to a second aspect, an apparatus for carrying out a method for protecting a plurality of location-related messages is claimed, with the following facilities: At least one provider transmission facility for transmitting the messages to a plurality of temporally changing recipients and/or temporally changing receiver facilities in at least one specific locality, wherein each message exhibits a signature for proof of the originator status of the respective provider and its belonging to the respective message. At least one key provider transmitter facility for the provision of public key certificates valid for the respective specific locality for the respective locality. A checking facility for the checking, carried out by means of the key certificates, of the signature of each received message and verification or determination of the false status of the respective message according to the result of the check.

A method according to the invention allows for the provision of authentic location-related messages by the use of location-based key infrastructures. Messages are protected by an identity-based key and a local validity range of the key is determined.

For the use of location-based services in critical infrastructures and sensitive environments, a dedicated security concept is required. Due to the location relationship of stored messages and information, a security concept must likewise be designed as location-based. Such a security concept can be realized with a method according to the invention and an apparatus according to the invention.

According to the invention, it has been recognized that, for the protection of location-based messages, location-based information is used in key infrastructures. In this way, keys can be issued in a location-related manner, which are therefore valid in a specific defined local environment of a validity range of a stored message. The items of information protected with this key material are in this way likewise bound to the respective location validity.

A use of a method according to the invention or an apparatus according to the invention can extend to all location-based services which are used, for example, in infrastructure and industrial environments.

Complex geographical units can be emulated in detail with a method according to the invention, such as buildings, industrial areas, or airport infrastructures, for protection against falsified messages.

A use of a method with a public key, referred to as a public key method, allows access to broad and dynamically changing user groups. Infrastructures with public keys (Public Key Infrastructures; PKI's) additionally allow for a smooth transition from location-based to identity-based infrastructures.

Further advantageous embodiments are claimed in connection with the subclaims.

According to an advantageous embodiment, time durations can be allocated to the key certificates, for which the key certificates are then valid.

According to a further advantageous embodiment, the time durations can be regular and/or repeat on a daily basis.

According to a further embodiment, a location-time characteristic can be allocated in each case to the key certificates, to which the key certificate is valid. As an alternative, or cumulatively, a temporally changing locality can be allocated to the key certificates, for which the key certificates are valid. A locality can change temporally, for example, in respect of its position and/or its size.

According to a further advantageous embodiment, additional items of information can be allocated in each case to the key certificates, where these key certificates and/or other key certificates are valid.

According to a further advantageous embodiment, an additional item of information can be allocated in each case to a key certificate, for the type of transmission of which this key certificate is valid.

According to a further advantageous embodiment, the transmission of the messages carried out by the provider to the at least one locality can take place after a first enquiry to the provider made by means of a receiver facility.

According to a further advantageous embodiment, the first enquiry may include whether messages are present for the locality at a particular point in time.

According to a further advantageous embodiment, the provision made by the one key provider of public key certificates, valid for the respective locality, for the respective locality can take place after a second enquiry to the key provider carried out by means of a receiver facility.

According to a further advantageous embodiment, the second enquiry may include whether valid public key certificates are present for the locality at a particular point in time.

According to a further advantageous embodiment, a check can be carried out of the validity of the key certificates provided in respect of the correct locality.

According to a further advantageous embodiment, a check can be carried out of the validity of the key certificates provided in respect of the correct time duration.

According to a further advantageous embodiment, the key certificate can exhibit a signature for proof of the creatorship of the respective key provider and its belonging to the respective key certificate.

According to a further advantageous embodiment, the provider can be the key provider.

According to a further advantageous embodiment, the key certificate valid for a locality can exhibit a reference to a locality description structure for the identification of the locality in a plurality of localities.

According to a further advantageous embodiment, the locality description structure can be a vector graphic supplemented by absolute spatial co-ordinates.

According to a further advantageous embodiment, the reference can exhibit a signature to prove creatorship of the locality description structure and its belonging to the respective reference.

According to a further advantageous embodiment, the locality description structure can additionally allocate a further security algorithm to every key certificate valid for a locality.

According to a further advantageous embodiment, the provision of public key certificates valid for the locality in each case can only be carried out for the respective locality if additionally an identity, a receiver, and/or a receiver facility has been verified.

According to a further advantageous embodiment, the plurality of location-related messages can be dynamic data for the executing of programs in respective receiver facilities in the specific localities.

According to a further advantageous embodiment, the executing of a program can comprise an authorized transmission by means of a transmitter facility allocated to one of the respective receiver facilities.

According to a further advantageous embodiment, an interrogation facility allocated to the receiver facility can be provided in order to interrogate the provider as to whether messages are present for the receiver facility inside a locality at a particular point in time.

According to a further advantageous embodiment, the provider transmitter facility can be prepared for the transmission of the messages present, carried out in response to the interrogation, wherein these messages can be supplemented by a signature for proof of creatorship of the provider and their belonging to the messages.

According to a further advantageous embodiment, the interrogation facility allocated to the receiver facility can be prepared so as to interrogate a key provider as to whether valid public key certificates are present for the locality at that point in time.

According to a further advantageous embodiment, the key providing facility can be prepared for the transmitting or sending, in response to the interrogation, of public key certificates valid for the locality to the receiver facility.

According to a further advantageous embodiment, the receiver facility can be prepared for the checking, carried out by means of the key certificates, of the signature of each received message, for verification or determination of the false status of the respective message according to the result of the check.

According to a further advantageous embodiment, the receiver facility can be prepared for checking the validity of the received key certificate in respect of the correct locality and the correct point in time.

The present invention is described in greater detail on the basis of exemplary embodiments in conjunction with the figures. The figures show:

DESCRIPTION OF THE INVENTION

Figure 1:
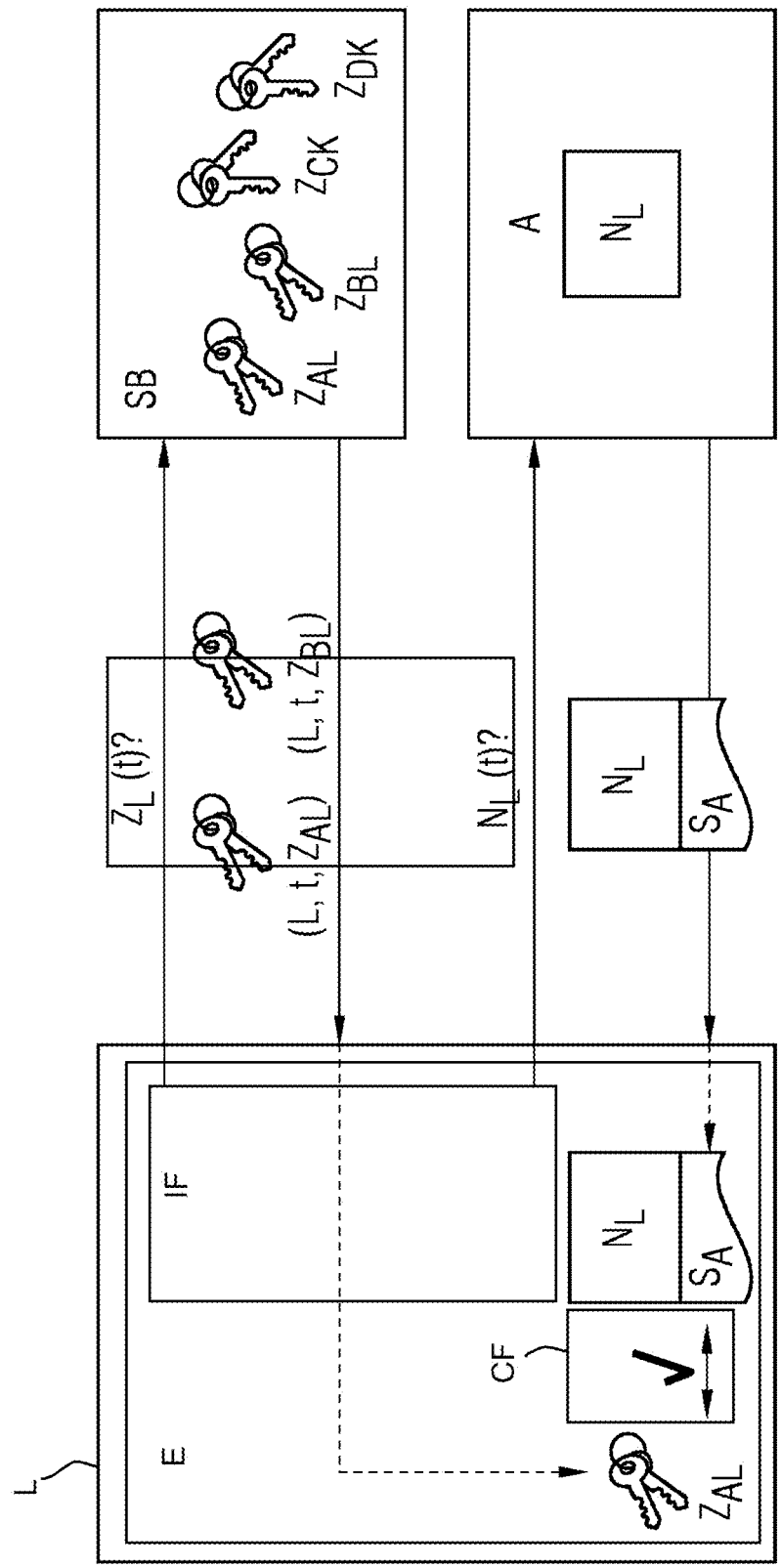
FIG. 1 a first exemplary embodiment of a method according to the invention.

FIG. 1 shows an exemplary embodiment of a method according to the invention. FIG. 1 shows, as an exemplary embodiment, a verification of a digital graffiti message by means of location-based key infrastructures. If, for example, what is referred to as a digital graffiti message $N_L$ is deposited by the provider A at a specific location or locality L, then this will be supplemented by a signature $S_A$. A receiver E can now interrogate, by means of a key service, the public keys which are valid at the locality L at a point in time t, and receives, for example, a key certificate $Z_{AL}$. On verification of the message $N_L$, the receiver E checks a validity of the key certificate $Z_{AL}$ in respect of the locality L and further conventional parameters, such as, for example, a temporal validity of the key certificate. If a check of the certificate and of the message signature, via a checking facility CF, reveals that the respective message $N_L$ is verified, then the receiver E processes the message $N_L$ in the locality L. For example, the contents can be displayed, or a multimedia message can be read out. According to FIG. 1, in a first step an interrogation can be made by a receiver E via its interrogation facility IF, in a particular locality L to a provider A, as to whether messages N are present for the locality L at a point in time t. Such an interrogation is identified in FIG. 1 by $N_L(t)$? Following such an interrogation to the provider A, he/she sends, in a second step, a message $N_L$ signed with a digital signature $S_A$, intended for the point in time t for the locality L. The signed message $N_L$ can, for example, be stored in the locality L, or read out directly by the receiver E, after the following two steps have been carried out. With the third step, an interrogation is made as to whether key certificates Z are present for the interrogation locality L for a point in time t. Such an interrogation, with a location-based key service OS, is expressed as $Z_L(t)$? In response to such an interrogation, the location-based key service OS or the key provider SB, transmits or sends corresponding key certificates (L, t, $Z_{AL}$) and, for example, additionally (L, t, $Z_{BL}$). In principle, key certificates can be prepared in any technical embodiment in the corresponding locality. For example, key certificates can already be deposited or stored in the locality. If the required key certificates, in this case specifically $Z_{AL}$, for the message $N_L$ signed with the digital signature $S_A$, are present in the specific locality L, the verified message $N_L$ can be verified and read out. The location information entered in the key certificate can likewise be coupled in connection with allocated times, such that the information at the location can only be validated at specific times. In addition, the location couplings and time couplings can likewise be arranged as paths, in the manner of "moving certificates", such that the information can move at specific times to specific locations, and will only be valid there in each case. Specific locations can be determined by means of a defined volume, for example as a specific area in a specific story of a building, for which a key certificate Z is valid. A locality or a location or locality volume respectively need not be described statically with absolute co-ordinates, or positioned fixed in a defined environment. Locality or locality volume can likewise change temporally, for example in respect of position and size and shape. Examples can be a package in an aircraft or vehicle, or an item of digital graffiti, which is linked to a position of a traveling vehicle. In this way, for example, error messages or consumption values of the vehicle can be acquired. The position of a locality can therefore be linked to the vehicle and its position.

The location-based reference also allows for more extensive information in the key certificate, such as, for example, a locational extent, a warning area, in which the verification is indeed successful, but an indication is given to the receiver E or user respectively that the key certificate is located at the edge of a permitted area, height information, for example a validity of a certificate only on one storey, references to cells or volumes surrounding certificates, overlapping structures, at which two different key certificates are valid at one point, access service and infrastructure information, if, for example, a digital graffiti message is only valid at a specific point if it has been received over a secure WLAN connection.

Figure 2:
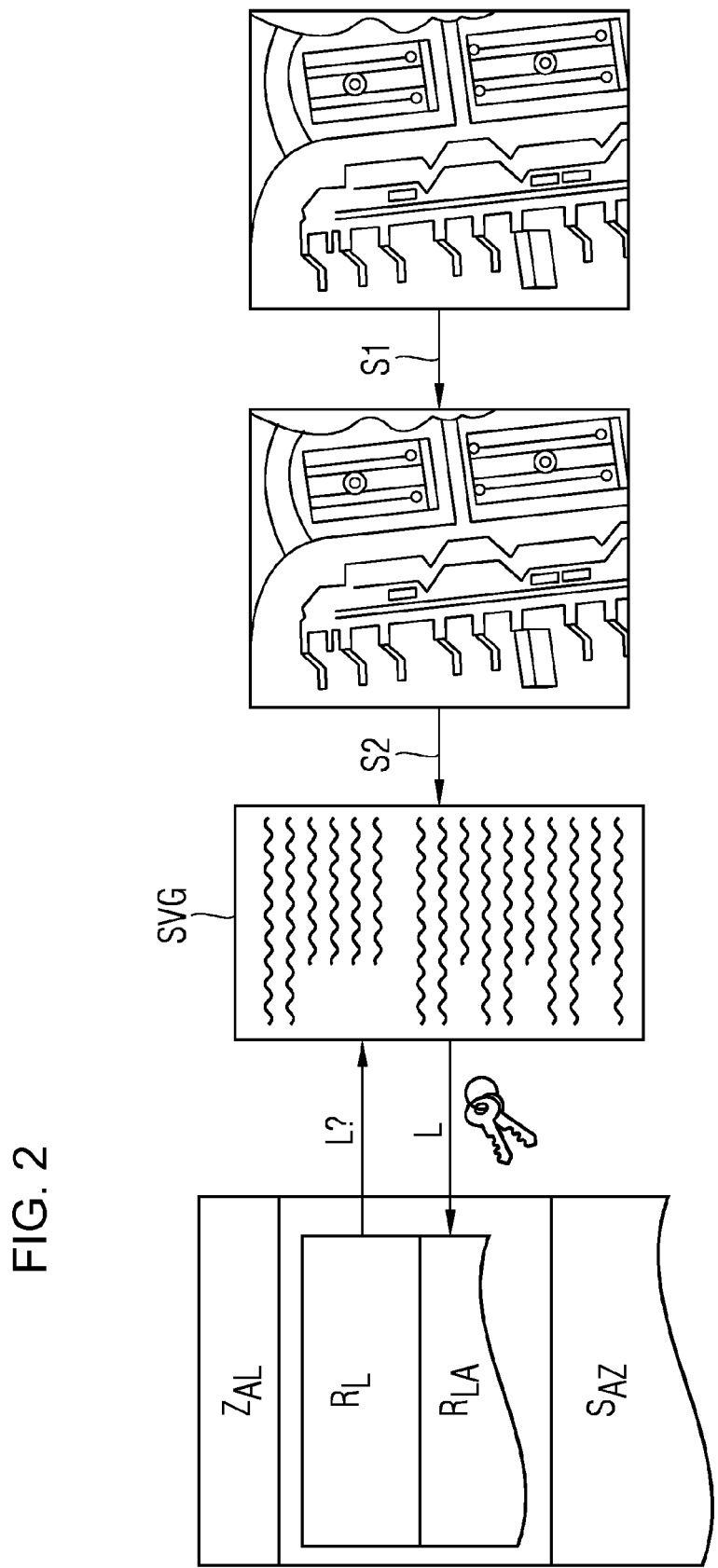
FIG. 2 an exemplary embodiment of a signed reference to a locality description structure.

FIG. 2 shows a key certificate $Z_{AL}$ which is only valid for a locality L, which has been determined by means of a reference $R_L$ to a location description. Such a location description can be provided as a locality description structure, which is provided as vector graphics for instances supplemented by absolute location co-ordinates. Such a scalable vectographic SVG is a mathematical locality description structure, which can be derived by means of abstract data relating to a totality of localities L from geographical data of the totality of a plurality of localities L. FIG. 2 shows on the right-hand side an airport complex, the geographical data of which are present. In a first step S1, the geographical data is transformed into abstract data of the totality of the localities L, which in a second step S2 is expressed, for example, into the scalable vector graphic SVG as a description of the totality of the plurality of localities L. By means of the reference $R_L$ on the locality description structure SVG, the location or locality respectively is determined for which the certificate $Z_{AL}$ is valid. Additionally, the key certificate $Z_{AL}$ can be signed with a signature S. Likewise, the reference $R_L$ can be signed with a signature $S_{AR}$. In this way, a creatorship of a respective provider A can be proven, and its belonging to the respective signature $S_{AZ}$. Likewise, a creatorship of a respective location description and its belonging to the respective reference $R_L$ can be proven. In other words, in order likewise to be able to delimit areas which are fine, granular, or locally complex to delimit, into key certificates, spatial areas are separately described and signed by signed structures. Such an embodiment is shown in FIG. 2. Such building structures are then only provided once, and referenced by the respective key certificates. The advantage is that the complex structures for the location description only need to be downloaded and verified once. It is then only necessary for the reference still to be checked in each case in the key certificates. As the description format, use may then be made, for example, of vectographic formats such as SVG (scalable vector graphics), which can be supplemented by absolute location co-ordinates. FIG. 2 shows signed references on locality descriptions. Moreover, a location description can likewise be coupled to a different security policy, such that, for example, at further external areas of a bank or an airport, weaker algorithms come into play, while in more critical inner infrastructures, however, higher security requirements apply. A mutual certification of identity-based and location-based certification services can be carried out, for example, by means of a cross-certification or by means of a joint root-certification instance. A depositing of location information and location references can take place, for example, in what are referred to as X.509 certificates by means of location-specific attributes, which are only evaluated by verification functions, which support locality information. In addition to the authenticity of static information, the authenticity of dynamic data likewise plays a part, such as, for example, what are referred to as applets, which it is intended should only be carried out at specific locations or at specific times respectively. Thus, for example, signaling systems should in future likewise be able to be downloaded as applets on mobile terminals. In emergency situations, these applets will then receive information about fires or persons running amok. In order for the information only to be capable of being sent to the correct locations, and not by unauthorised persons, protecting can be carried out by means of methods according to the invention.

The invention claimed is:

1. A method for protecting a plurality of location-related messages transmitted by at least one provider to at least one of a plurality of temporally changing recipients or a plurality of temporally changing receiver facilities in at least one specific locality, which comprises the steps of:
   performing a transmission carried out by the provider of messages each exhibiting in each case a signature as proof of creatorship by the provider and a belonging to a respective message, to the at least one specific locality;
   providing public key certificates via at least one key provider, the public key certificates being valid for the specific locality;
   allocating a location-time characteristic curve or a temporal change of the specific locality to the public key certificates, for which the public key certificates are valid;
   allocating a size and a position of the specific locality to the public key certificates, for which the public key certificates are valid;
   checking the signature of each of the messages received by means of the public key certificates; and
   verifying or determining a false status of the respective message according to a result of the checking.

2. The method according to claim 1, which further comprises allocating time durations to the public key certificates, for which the public key certificates are valid.

3. The method according to claim 2, wherein the time durations are at least one of regular or repeated daily.

4. The method according to claim 1, which further comprises allocating additional items of information to the public key certificates where at least one of the public key certificates or further public key certificates are valid.

5. The method according to claim 1, which further comprises allocating an additional item of information to the public key certificates, indicating with which type of transmission the public key certificates are valid for.

6. The method according to claim 1, wherein the transmitting carried out by the provider of the messages to the at least one special locality takes place after an interrogation of the provider carried out by means of a receiver facility.

7. The method according to claim 6, which further comprises performing a first interrogation to determine whether the messages are present for the specific locality at a point in time.

8. The method according to claim 7, which further comprises
   transmitting the public key certificates valid for the specific locality from the key provider to the specific locality after a second interrogation of the key provider is carried out by means of the receiver facility.

9. The method according to claim 8, wherein the second interrogation determines whether the public key certificates are present which are valid for the specific locality at the point in time.

10. The method according to claim 7, which further comprises checking a validity of the public key certificates provided in respect of a correct locality.

11. The method according to claim 2, which further comprises checking a validity of the public key certificates provided in respect of a correct time duration.

12. The method according to claim 1, wherein a respective public key certificate exhibits the signature as proof of creatorship from the key provider and its belonging to the respective public key certificate.

13. The method according to claim 1, wherein the provider is the key provider.

14. The method according to claim 1, wherein a public key certificate valid for the specific locality exhibits a reference to a locality description structure for an identification of the specific locality in a plurality of localities.

15. The method according to claim 14, wherein the locality description structure is a vector graphic supplemented by absolute location co-ordinates.

16. The method according to claim 14, wherein the reference exhibits the signature for proof of creatorship of the locality description structure and its belonging to the reference.

17. The method according to claim 14, wherein the locality description structure assigns to each of the public key certificates valid for the specific locality, additionally, a further security algorithm.

18. The method according to claim 14, which further comprises providing the public key certificates valid for the specific locality only if an identity of at least one of a recipient or a receiver facility has been verified.

19. The method according to claim 1, wherein the messages are dynamic data for execution of programs in respective receiver facilities in the specific localities.

20. The method according to claim 19, wherein an execution of a program contains an authorized transmission by means of a transmitter facility allocated to a respective receiver facility.

21. An apparatus for carrying out a method for protecting a plurality of location-related messages, the apparatus comprising:
   a plurality of temporally changing receiver facility computers;
   at least one provider transmitter facility computer for transmitting messages to at least one of a plurality of temporally changing recipients or said plurality of temporally changing receiver facility computers in at least one specific locality, wherein each one of the messages exhibits messages which exhibit a signature for proof of creatorship by said provider transmitter facility computer and its belonging to the messages;
   at least one key provider facility computer for providing public key certificates valid for a respective specific locality, a location-time characteristic curve or a temporal change of the specific locality being allocated to the public key certificates, for which the public key certificates are valid, and a size and a position of the specific locality further being allocated to the public key certificates, for which the public key certificates are valid; and
   a checking facility computer for checking, carried out by means of the public key certificates, of the signature of each of the messages received, said checking facility computer further verifying or determining a false status of a respective message according to a result of a check.

22. The apparatus according to claim 21, further comprising an interrogation facility, allocated to said receiver facility computers, for interrogating said provider transmitter facility computer as to whether the messages for one of said receiver facility computers are present inside a locality at a point in time.

23. The apparatus according to claim 21, wherein said provider transmitter facility computer for the transmitting of the messages present, is carried out in response to an interrogation, wherein these are supplemented by the signature for proof of a creatorship of said provider transmitter facility computer and its belonging to the messages.

24. The apparatus according to claim 22, wherein said interrogation facility, allocated to said receiver facility computer, for interrogating said key provider facility computer as to whether the public key certificates are present for the specific locality at a point in time.

25. The apparatus according to claim 21, wherein said key provider facility computer for transmitting, carried out in response to an interrogation, of the public key certificates valid for the specific locality to said receiver facility computer.

26. The apparatus according to claim 21, wherein each of said receiver facility computers performs checking, carried out by the public key certificates, of the signature of each received message and verification or determination of the false status of the respective message according to a result of the check.

27. The apparatus according to claim 21, wherein each of said receiver facility computers checks a validity of the public key certificates received in respect of a correct locality and a correct point in time.

* * * * *